(No Model.)
W. PORTER & H. GEORGE.
TROLLEY.
No. 425,694. Patented Apr. 15, 1890.
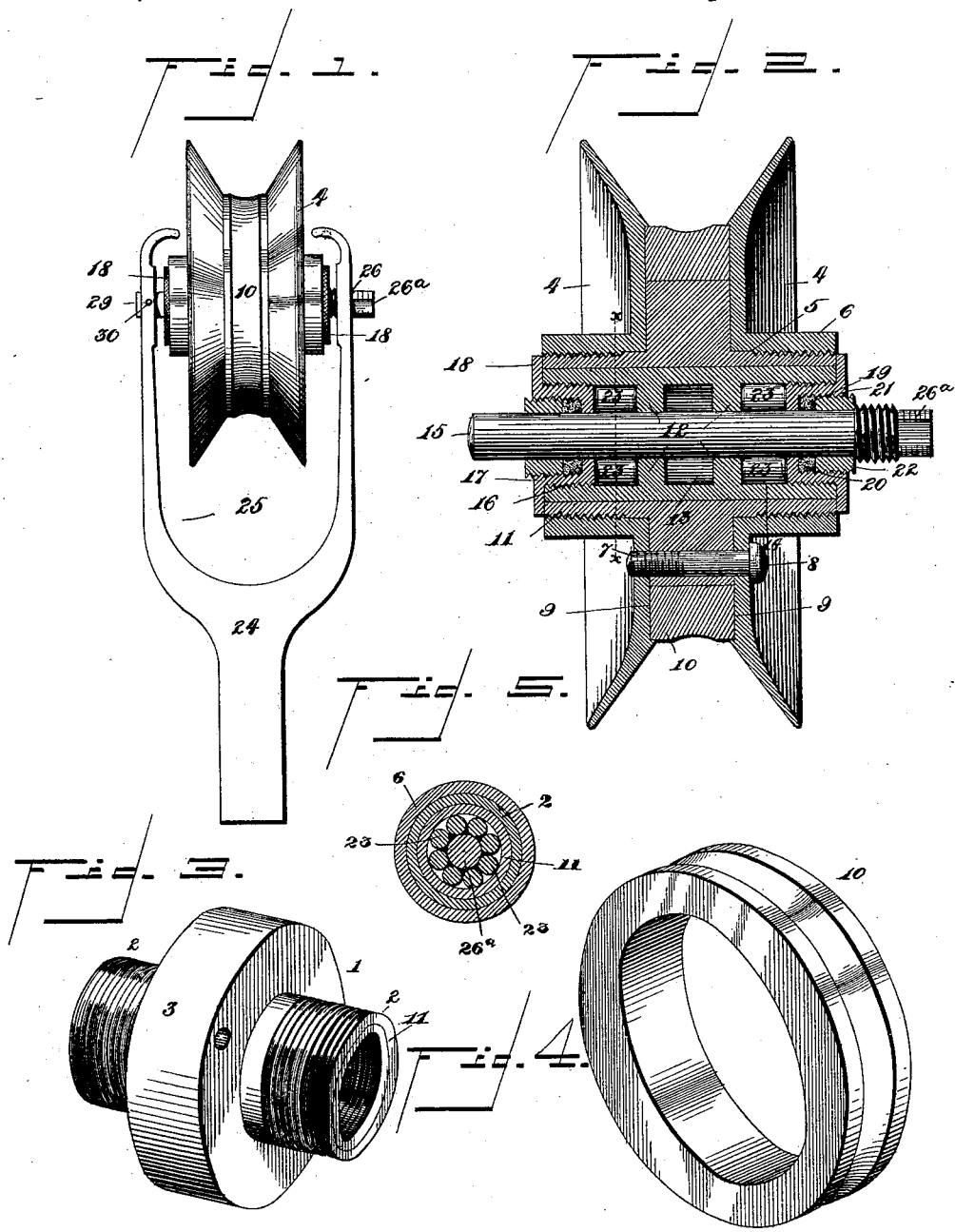
Witnesses:
Samuel Kid
W. T. Duvall
Inventors
Wallace Porter.
Henry George
By their Attorneys, C. A. Snow & Co.
THE NORRIS PETERS CO., PHOTO-LITHO., WASHINGTON, D. C.

UNITED STATES PATENT OFFICE.

WALLACE PORTER AND HENRY GEORGE, OF WILKES-BARRÉ, PENNSYLVANIA.

TROLLEY.

SPECIFICATION forming part of Letters Patent No. 425,694, dated April 15, 1890.

Application filed March 8, 1890. Serial No. 343,168. (No model.)

*To all whom it may concern:*

Be it known that we, WALLACE PORTER and HENRY GEORGE, citizens of the United States, residing at Wilkes-Barré, in the county of Luzerne and State of Pennsylvania, have invented a new and useful Trolley, of which the following is a specification.

This invention has relation to improvements in trolleys for travel upon overhead wires in electrical railways.

It is well known among those conversant with electrical railways and the employment of overhead trolleys that great difficulty has been experienced in securing a proper lubrication for the same whereby an ease of running is secured, and also the necessity of frequent stoppage of the trolley for lubricating purposes is avoided. It is highly desirable to provide a trolley which will be so constructed as to be practically self-oiling for a considerable period of time, whereby the high rate of speed at which they are revolved may be maintained without excessive wear of the bearings; furthermore, to provide a trolley so constructed that the wearing portion or tread may be replaced after wear, and also one in which the internal fine steel bearings may be reused after the tread portion and other parts of the trolley have become worn.

To secure the above advantages are therefore the objects of our invention. Other objects and advantages of the invention will hereinafter appear, and the novel features thereof will be particularly pointed out in the claims.

Referring to the drawings, Figure 1 is an elevation of a trolley constructed in accordance with our invention. Fig. 2 is a transverse section of the same. Fig. 3 is a detail in perspective of the hub. Fig. 4 is a similar view of the wearing ring or tread. Fig. 5 is a transverse section on the line $x$ $x$, Fig. 2.

Like numerals indicate like parts in all the figures of the drawings.

1 represents the hub, which is cylindrical and provided with a hollow, and at opposite ends with oppositely-threaded portions 2. The central portion of the hub is provided with an annular rigid and preferably integral boss 3, the threaded ends of the hub extending at each side of said boss.

4 represents the opposite annular flanges of the trolley, which are of the usual shape in general, they having their inner faces convexed and provided with a central opening 5, surrounded by an outwardly-projecting collar 6, integrally formed with the flange. The collars 6 of the two flanges are oppositely threaded internally and adapted to be screwed down to position upon each side of the annular boss 3, so as to bind tightly thereupon, and when in this position the boss and flanges have drilled therethrough a threaded opening 7, in which is inserted a transverse locking-bolt 8, whereby the three elements—the two flanges and the intermediate boss—are snugly bound together. The opposite inner faces of the two flanges 4 are provided with an annular shallow recess 9, which recess is concentric with and surrounds the annular boss 3.

10 represents a wearing-tire, ring, or tread having an inner diameter adapting the same to snugly fit upon the annular solid boss 3, and an outer diameter adapting the same to fit within the shallow annular recess 9, in which position said tread or ring is snugly bound by the two circular flanges 4. The exterior periphery of the ring is slightly concaved, so as to adapt the same for travel upon the overhead wire, as is usual.

From the above it will be evident that the wearing-ring may be easily removed and replaced by a new ring when the same shall have become so worn as to render it useless. The operation of substituting the new ring will be apparent, in that it is simply necessary to remove the bolt 8 and unscrew one of the circular flanges 4, insert a new ring, and replace the parts in the manner heretofore described.

From the construction described it will be seen that the wearing ring, tire, or tread is most rigidly and solidly mounted upon the trolley, that no lateral movement whatever of the ring can take place, thus insuring a most even and gradual wear, so that the contact of the trolley and the electrical current will remain absolutely uninterrupted.

Mounted in the hub 1 and extending throughout the length of the same is a hollow steel bushing 11, which at equal points from its ends is provided with a pair of internal bearing-collars 12, thereby forming intermediate said collars an oil-supply space 13, and at each outer side there is formed a chamber 14.

15 represents the axle-bearing in the collars 12.

For a short distance at the opposite ends of the steel bushing the same is internally threaded, and mounted upon the shaft, which passes through an opening 16 formed therein, is a steel threaded sleeve 17, provided at its outer end with an annular milled disk 18. The sleeve is provided with exterior screw-threads by which it may be adjusted within the bushing so as to contract or increase the space 14 formed between it and the adjacent bearing-collar 12. Near its rear end the sleeve is provided with an internal annular chamber 19, in which is mounted a packing 20 of wool, leather, or other non-absorbent material. The front end of the sleeve is somewhat larger than the axle, and is interiorly threaded, as at 21, and mounted in the threads thereof is a threaded collet 22, adapted to be adjusted so as to bear upon and compress the washer or packing 20 within in the rear or inner end of the sleeve, so that the same will be expanded more or less tightly within its chamber and impinge upon the axle. In the chambers 14 there is mounted an annular series of ball or roller bearings 23, which may be adjusted so as to take up wear by means of the milled disk 18.

24 represents the trolley-arm, which terminates at its upper end in the bifurcated yoke 25, provided near its ends with opposite openings 26, one of which is threaded interiorly to receive the external threads formed near one end of the axle, and beyond said end the axle is squared, as at 26ª, to receive a wrench, whereby it may be removed. Any ordinary means may be employed for connecting the opposite end of the axle to the opposite bifurcation or yoke-arm, and in this instance we have merely drilled an opening 29 in the axle and inserted therein a pin 30.

It will be observed that the two internal collars formed upon the steel bushing combine to form an intermediate annular oil-receiving chamber or reservoir, which will retain sufficient oil to slowly lubricate the bearings of the collars and balls for considerable length of time without a refilling thereof. By reason of the packing and the means for adjusting the same it will be apparent that no leakage of the oil can possibly occur, and that a most thorough lubrication of all the friction-producing parts takes place. Furthermore, it is apparent that after the flanges and tread have become worn and useless it is apparent that the internal steel bushing may be removed therefrom and reused in a new trolley.

Having described our invention, what we claim is—

1. In a trolley, the combination, with the hub, the ends of which are oppositely threaded, and a rigid boss mounted upon the hub between its ends, of opposite annular flanges threaded upon the ends of the hub, and a removable wearing-ring snugly fitting the boss and bound upon by the opposite flanges, substantially as specified.

2. In a trolley, the combination, with a hollow hub exteriorly threaded in opposite directions and provided with a solid integral annular boss centrally located, of a removable wearing-ring fitting the boss and agreeing in width therewith, and opposite annular flanges having central openings provided with oppositely-disposed threads and adapted to be screwed upon the ends of the hub and to bind against the opposite sides of the wearing-ring, substantially as specified.

3. In a trolley, the combination, with the centrally-bored hub, the ends of which are oppositely and exteriorly threaded, said hub being provided with a central rigid annular boss and a wearing-ring removably mounted upon the boss, of opposite annular flanges having central openings oppositely threaded, mounted on the ends of the hub, and adapted to be bound against the opposite edges of the ring, and having their adjacent faces provided with annular shallow channels or recesses for the reception of the ring, substantially as specified.

4. In a trolley, the combination, with a centrally-bored hub having a central external rigid annular boss, and beyond said boss having its ends exteriorly and oppositely screw-threaded, and a wearing-ring removably mounted upon the boss, of opposite annular flanges having central openings oppositely threaded upon the ends of the hub and snugly binding against the sides of the ring and boss, registering openings formed transversely through the two flanges and the boss, and a transverse locking-bolt passing through said openings, whereby the boss and flanges are securely locked in their bound position, substantially as specified.

5. In a trolley, the combination, with a hollow bored hub provided with a steel internal bushing having opposite internal bearing-collars, and having its ends outside of the collars threaded and between said collars forming an oil-reservoir, an axle mounted in the hub and projecting at each side of the same, an annular series of anti-friction balls or rollers encircling the axle outside of the collars, a sleeve threaded in the ends of the bushing and having its rear end bearing upon the anti-friction devices, a packing encircling the axle and mounted in the bottoms of the sleeves, and a threaded collet threaded in the front ends of each of the sleeves, substantially as specified.

6. In a trolley, the combination, with the centrally-bored hub provided with an internal steel bushing having opposite internal bearing-collars, an axle mounted in the collars, and a reservoir formed between said collars, of a series of balls or rollers encircling the axle outside of the collars, and an adjusting-sleeve threaded in the ends of the bushings bearing on the balls encircling the axle and having milled disks for operating the same, substantially as specified.

7. In a trolley, the combination, with a hollow bored hub provided with a steel internal bushing having opposite internal bearing-collars, and having its ends outside of the collars threaded and between said collars forming an oil-reservoir, an axle mounted in the hub and projecting at each side of the same, an annular series of anti-friction balls or rollers encircling the axle outside of the collars, and a sleeve threaded in the ends of the bushing and having its rear end bearing upon the anti-friction devices, substantially as specified.

In testimony that we claim the foregoing as our own we have hereto affixed our signatures in presence of two witnesses.

WALLACE PORTER.
              HENRY GEORGE.

Witnesses:
    A. J. GRIFFIN,
    ELIAS COHEN.